J. WATERLOO & G. W. KLAGES.
GLASS CUTTING APPARATUS.
APPLICATION FILED JUNE 2, 1914.

1,272,158.

Patented July 9, 1918.
3 SHEETS—SHEET 1.

WITNESSES

INVENTORS

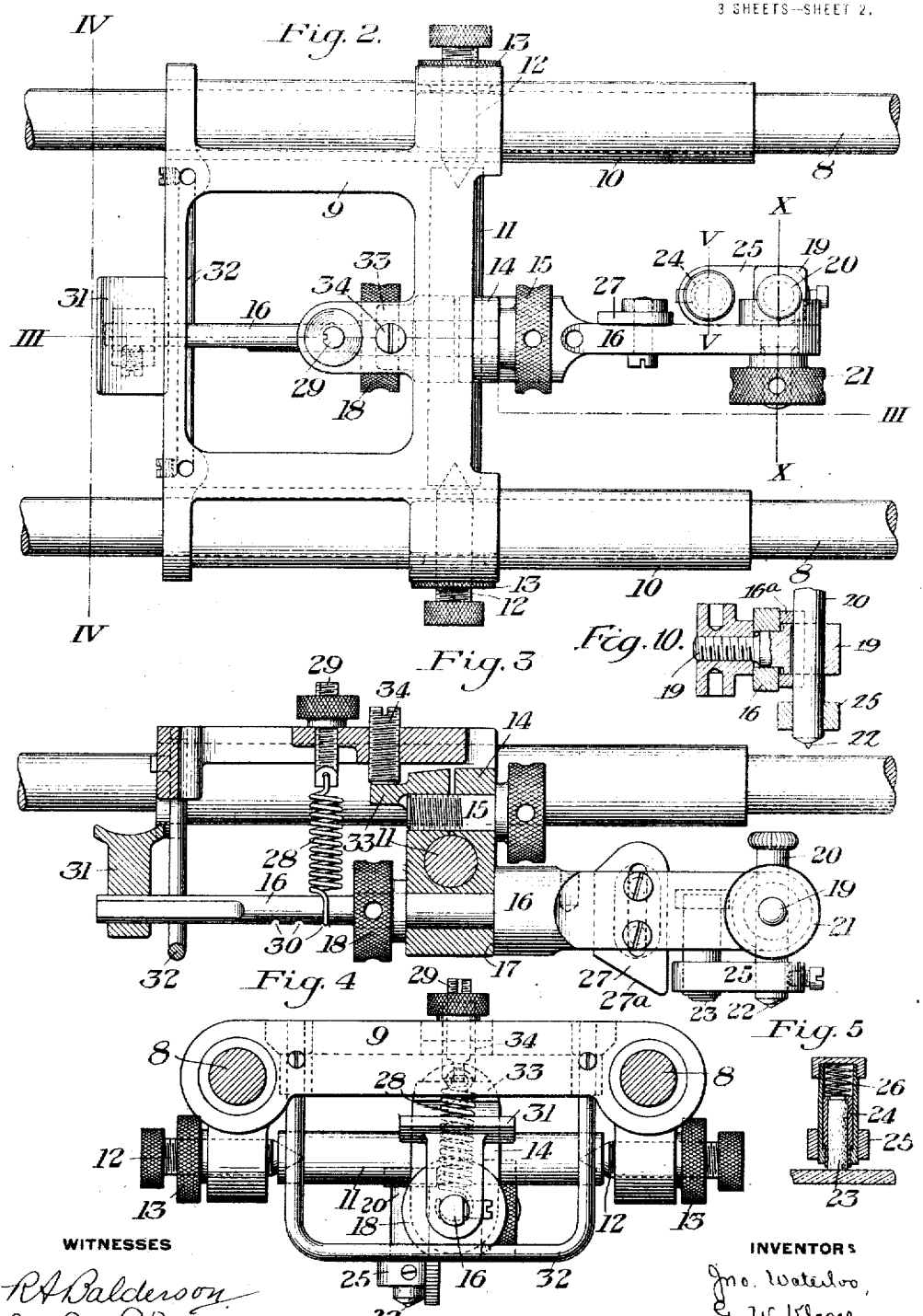

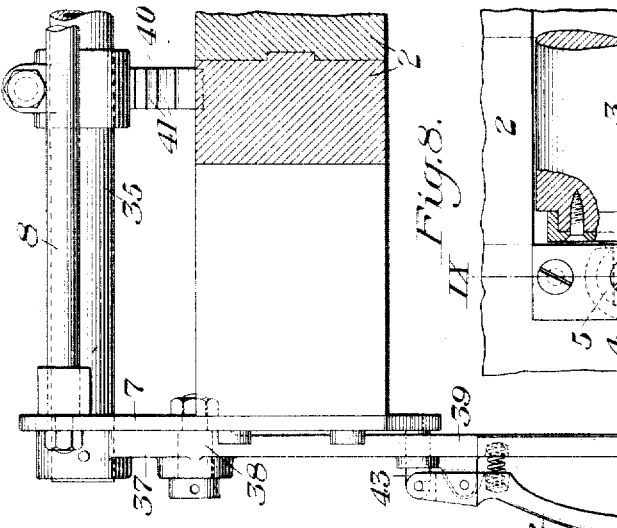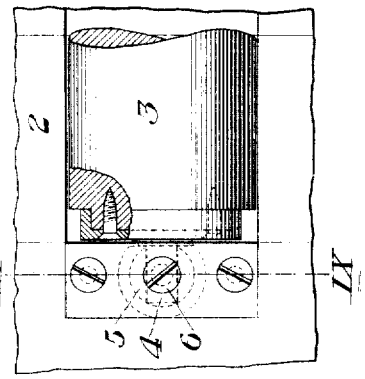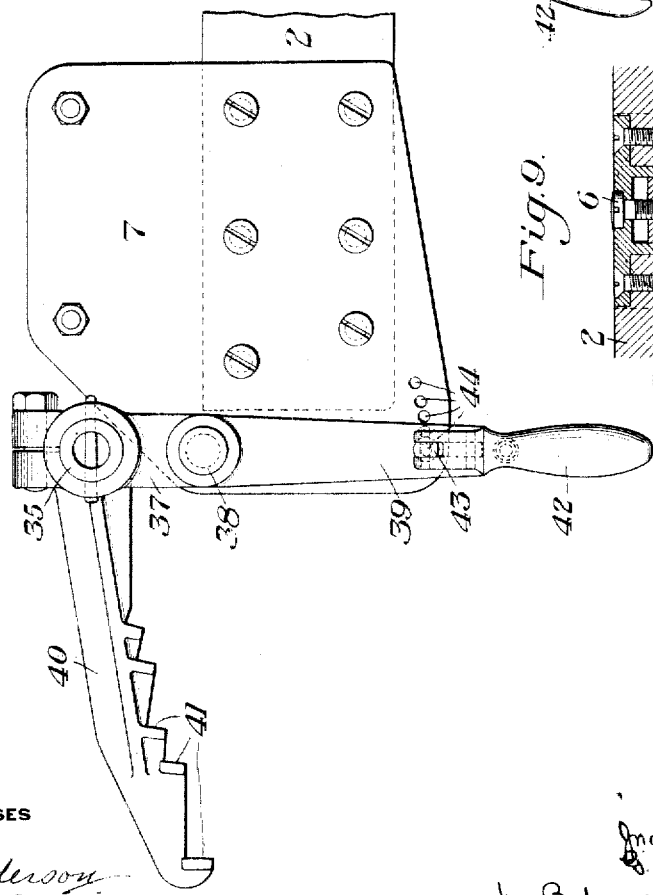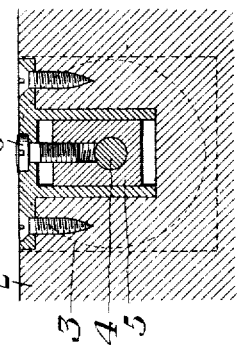

UNITED STATES PATENT OFFICE.

JOHN WATERLOO, OF MONONGAHELA, AND GEORGE W. KLAGES, OF PITTSBURGH, PENN-SYLVANIA, ASSIGNORS TO WINDOW GLASS MACHINE COMPANY, OF PITTSBURGH, PENNSYLVANIA, A CORPORATION OF NEW JERSEY.

GLASS-CUTTING APPARATUS.

1,272,158.   Specification of Letters Patent.   Patented July 9, 1918.

Application filed June 2, 1914. Serial No. 842,437.

*To all whom it may concern:*

Be it known that we, JOHN WATERLOO and GEORGE W. KLAGES, citizens of the United States, residing, respectively, at Monongahela, Washington county, Pennsylvania, and at Pittsburgh, Allegheny county, Pennsylvania, have invented a new and useful Improvement in Glass-Cutting Apparatus, of which the following is a full, clear, and exact description, reference being had to the accompanying drawings, forming part of this specification, in which:

Fig. 2 is a plan view showing the cutter carriage;

Figs. 3, 4 and 5 are sections taken, respectively, on the lines III—III, IV—IV and V—V of Fig. 2;

Fig. 6 is an end view showing a portion of the frame for the cutter carriage and one of the gages;

Fig. 7 is a detail view partly in elevation and partly in section showing one end portion of said frame;

Fig. 8 is a detail view partly in plan and partly in section showing the mounting for one of the table rollers; and Fig. 9 is a section on the line IX—IX of Fig. 8.

Fig. 10 is a section on the line X—X of Fig. 2.

Figure 1:
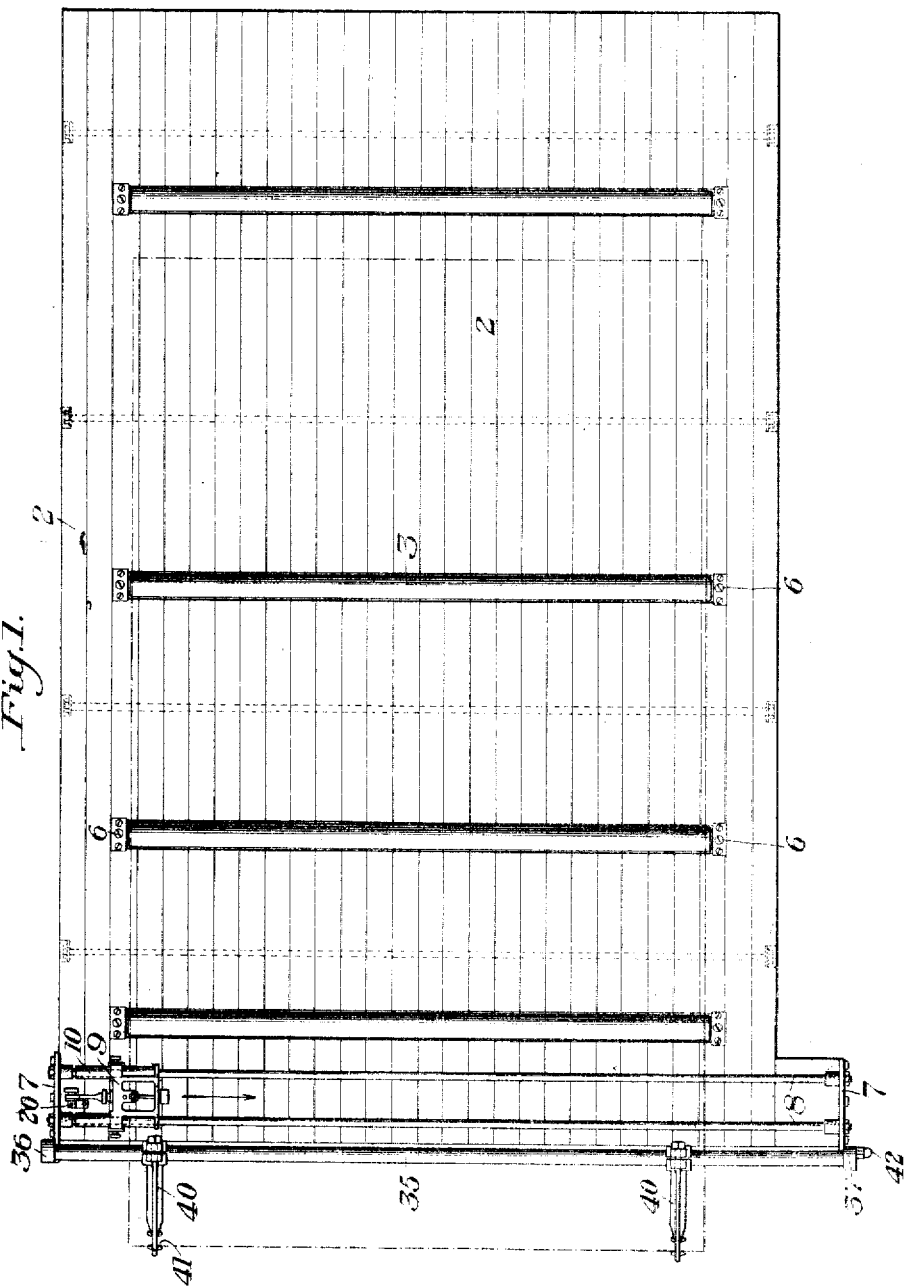
Figure 1 is a plan view of a glass-cutting table showing our invention applied thereto.

Our invention has relation to apparatus for cutting glass plates, or sheets, and is designed to be attached to a glass-cutting table.

The object of our invention is to provide apparatus of this character by means of which the cutting may be very accurately done, in which the parts are capable of giving any desired adjustment to the cutting point, and which is simple and convenient in its construction and mode of operation.

In the accompanying drawings, the numeral 2 designates a glass-cutting table which may be of any suitable construction. 3 designates transverse rollers which are journaled at intervals in recesses formed in the upper surface of the table 2, and upon which glass plates or sheets to be cut are moved to the action of the cutter. These portions are preferably capable of vertical adjustment with respect to the surface of the table, and for this purpose, I have shown their journals 4 as mounted in vertically adjustable bearing blocks 5, see Figs. 8 and 9. These bearing blocks can be adjusted vertically by means of the adjusting screws 6.

Secured to the cutting end of the table 2 is a frame which is shown as consisting of the end brackets 7, supporting the two parallel transverse guide rods 8. 9 is a carriage adapted to slide transversely on the guide rods 8, and having the sleeves 10, which have a close sliding fit with said rods. 11 is a shaft, whose end portions are provided with bearings in the side of the carriage. These bearings preferably consist of the pointed trunnion screws 12, secured by means of the lock nuts 13. By means of these trunnion screws and lock nuts, the shaft 11 is capable of some endwise adjustment. 14 is a split bearing block, which is secured on the shaft 11 by means of a clamping screw 15. 16 is a tool carrier having a cylindrical portion, which is passed through an opening in the bearing block 14, below the shaft 11 with a shoulder 17 in front of said bearing block. The tool carrier is capable of a rotary movement in the block 14, to set the tool at different angles, and is secured in the desired position by means of the locking nut 18. Mounted in the forward end of the carrier is a short shaft or pin 19, which is formed with an opening through which the cutter post 20 extends. The said post 20 also has a seat in a collar 16ª, which abuts against the adjacent face of the carrier 16. A nut 21 engages the threaded end portion of the member 19, on the opposite side of the carrier 16 (see Fig. 10). By loosening the nut 21, the member 19 may be rotated to change the angular and vertical adjustments of the tool post. The cutting point 22 is secured in the lower end of the post 20. 23 designates a wiper of felt or other suitable material which is set in a suitable barrel or holder 24, secured in an arm 25 fastened to the tool post. This wiper is pressed into contact with the surface of the glass sheet just in front of the cutting point by means of a spring 26. In use, the wiper is kept lubricated. The use of this wiper is found in practice to very greatly prolong the life of the cutting point. 27 is a guard device secured to the tool carrier 16 in front of the wiper and having a beveled lower edge 27ª. The purpose of this device will be hereinafter explained.

The tool carrier 16, the parts carried thereby and the block 14 and shaft 11 all oscillate on the bearing on the trunnion screws 12. The cutting point is held in cutting contact with the glass by means of a spring 28, connected at its lower end to the member 16 in rear of the shaft 11, and at its upper end to an adjusting screw 29. The member 16 is preferably formed with a number of seats or engaging recesses 30, for the lower end of the spring, and whereby the tension of the spring may be adjusted to a greater extent than is possible with the nut 29. The rear end of the member 16 has a finger lever 31, by means of which the cutting point can be raised out of contact with the glass against the tension of the spring 28 in sliding the carriage idly upon the guide rods 8. Downward movement of the member 16 to a sufficient extent to injure the tension of the spring 28 is prevented by means of a stirrup or stop 32. The downward movement of the cutting point is limited by engagement with the stop projection 33 on the block 14 and the adjustable stop screw 34.

The numeral 35 designates a transverse shaft, one end of which is secured in an arm 36, pivoted to one of the brackets 7. Its other end is secured in an arm 37, pivoted at 38 to the other bracket 7, and extending downwardly to form a handle lever 39. Adjustably secured on the shaft 35 are a number of forwardly projecting gage arms 40, which can be adjusted to any desired position according to the width of the sheet or plate being cut. Each of these arms is provided on its lower side with a series of stop or gage notches or projections 41. The lever arm 39 carries the pivoted spring-pressed pawl lever 42, whose pin or pawl 43 is adapted to enter in one of a number of perforations 44, in the adjacent brackets 7 (see Figs. 6 and 7).

If it is desired to cut off a relatively narrow edge portion of the glass plate or sheet, the lever arm 39 is moved to the right (looking at Fig. 6) thereby depressing the gage arms 40 to a position in which the first notch or projection 41 would act as a stop for the forward edge of the plate or sheet. If the strip to be cut off is wider, the shaft 35 is adjusted to bring one of the other stops 37 in position to engage the front edge of the sheet. After the cut has been completed, the lever arm 39 is moved to the left a sufficient distance to raise the gages 40 entirely above the horizontal plane of the glass sheet, and thus permit it to be moved forward and off from the cutting table.

The operation will be readily understood. The gages are properly adjusted by means of the lever 39 and fixed in the adjusted position. The sheet or plate to be cut is then moved forward until its forward edge contacts with one of the gage stops 41. The cutter carriage is slid idly over to the farther side of the table, and the cutter carriage is then released to cause the spring 28 to press the cutting point into contact with the glass. The carriage is then moved back across the table on the guide rods 8 and makes the cut.

In case the carriage should be moved too far beyond the edge of the sheet before starting the cut, the guard 27 before described will either prevent the cutting point from dropping below the surface of the sheet or if the carriage is moved sufficiently far so that the guard itself drops over the edge of the sheet, its beveled lower edge 27ª will ride up over the edge of the sheet, and thus raise the tool to cutting position. The purpose of this guard is to prevent the tool dropping down behind the edge of the sheet where the cut is started, and thus preventing its coming to cutting position.

By means of the several adjustments described, the cutting point can be set exactly to the correct position for any desired cut, and can be readily adjusted to different kinds of work. The gages also constitute an important feature of the invention, since the sheet or plate can be stopped at exactly the right position for any desired cut, without attention on the part of the operator, after the gages have once been set. The entire apparatus is very simple in its construction, is exceedingly convenient to operate, and enables a large output of properly cut plates or sheets to be produced.

We do not desire to limit ourselves to the particular construction and arrangement of the various parts which we have herein shown and described, as it is obvious that these may be changed in details in various ways within the spirit and scope of the appended claims.

We claim:

1. Glass cutting apparatus, comprising a pivoted cutter carrier, a tool post mounted on said carrier, the carrier having a projecting arm, a barrel or holder mounted in said arm, a vertical wiper mounted in the barrel or holder, and a spring seated in the barrel or holder and pressing against the wiper, substantially as described.

2. Glass-cutting apparatus, comprising a movable cutter carriage, a cutter-carrier mounted for pivotal movement about a horizontal axis on said carriage, a cutting tool mounted on said carrier to move therewith and also having independent vertical and pivotal adjustments, and a wiper secured to said tool to move and be adjusted therewith, substantially as described.

3. Glass-cutting apparatus, comprising a carriage, a cutter carrier pivoted on the carriage, a cutting point mounted on said carrier, and a guard adjacent to the cutting point and adapted to control the position of said point at the edge of the plate or sheet to be cut, substantially as described.

4. Glass-cutting apparatus, comprising a cutting table, a guide member extending transversely of the table, a carriage mounted to slide freely on said guide member, an oscillating shaft trunnioned on said carriage, a cutter-carrier fixed to said shaft, and an elevating cam on said carriage in front of the tool, substantially as described.

5. Glass cutting apparatus, comprising a cutting table, a guide member extending transversely of the table, a carriage mounted to slide freely on said guide member, a cutter carrier mounted on said carriage, a cutter mounted on the carrier, and an adjustable guard on the carrier in front of the tool; substantially as described.

6. Glass cutting apparatus, comprising a movable cutter carriage, a cutter carrier mounted for pivotal movement about a horizontal axis on said carriage, a cutting tool mounted on said carrier to move therewith and arranged to be adjusted thereon, a sleeve adjustably mounted on said cutter, and a spring-pressed wiper within said sleeve; substantially as described.

In testimony whereof we have hereunto set our hands.

JOHN WATERLOO.
GEORGE W. KLAGES.

Witnesses:
WM. L. MONRO,
G. G. TRIEL.